United States Patent
Iyer et al.

(10) Patent No.: US 10,664,036 B2
(45) Date of Patent: May 26, 2020

(54) METHODS AND SYSTEMS FOR AN ELECTRONIC DEVICE OPERABLE WITH AN ATTACHMENT THAT PREVENT CHARGING OF A PRIMARY ENERGY STORAGE DEVICE FROM POWER DELIVERED BY THE ATTACHMENT BASED UPON WHETHER THE ATTACHMENT IS OPERATING A FUNCTION

(71) Applicant: Motorola Mobility LLC, Chicago, IL (US)

(72) Inventors: Boby Iyer, Elmhurst, IL (US); Kathryn Thomas, Chicago, IL (US); Kenny Kessler, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 106 days.

(21) Appl. No.: 15/782,609

(22) Filed: Oct. 12, 2017

(65) Prior Publication Data
US 2019/0113961 A1    Apr. 18, 2019

(51) Int. Cl.
G06F 1/26        (2006.01)
G06F 1/32        (2019.01)
G06F 1/3209      (2019.01)
H02J 3/14        (2006.01)
H02J 7/35        (2006.01)
G05B 15/02       (2006.01)
(Continued)

(52) U.S. Cl.
CPC .......... *G06F 1/3209* (2013.01); *G05B 15/02* (2013.01); *G06F 1/266* (2013.01); *H02J 3/14* (2013.01); *H02J 7/0042* (2013.01); *H02J 7/342* (2020.01); *H02J 7/35* (2013.01)

(58) Field of Classification Search
None
See application file for complete search history.

(56) References Cited

U.S. PATENT DOCUMENTS 6,820,206 B1 * 11/2004 Kim ........................ G06F 1/263
                                                    324/426
2007/0241618 A1 * 10/2007 Xu .................... G01R 19/16542
                                                    307/80

(Continued)

OTHER PUBLICATIONS

Definition of Operational, Merriam-Webster, 2019, pp. 2-4 (Year: 2019).*

*Primary Examiner* — Danny Chan
(74) *Attorney, Agent, or Firm* — Philip H. Burrus, IV (57) ABSTRACT

A method in an electronic device includes detecting, with one or more processors of the electronic device operating with an attachment having a predefined functionality, whether a function of the predefined functionality is operational on the electronic device. When the function is operational on the electronic device, the one or more processors can cause the following: an auxiliary energy storage device carried by the attachment to deliver power to the electronic device; a power management control circuit carried by the electronic device to power the one or more processors with the power delivered from the auxiliary energy storage device; and the power management control circuit to preclude charging of a primary energy storage device carried by the electronic device with the power delivered from the auxiliary energy storage device.

20 Claims, 6 Drawing Sheets

(51) Int. Cl.
*H02J 7/00* (2006.01)
*H02J 7/34* (2006.01)

(56) References Cited

U.S. PATENT DOCUMENTS

| | | | |
|---|---|---|---|
| 2008/0203970 A1* | 8/2008 | Shen | H02J 7/0054 |
| | | | 320/128 |
| 2009/0153358 A1* | 6/2009 | Park | H01M 10/44 |
| | | | 340/870.39 |
| 2012/0147536 A1* | 6/2012 | Sa | G06F 1/1632 |
| | | | 361/679.01 |
| 2013/0179719 A1* | 7/2013 | Tseng | G06F 1/263 |
| | | | 713/340 |
| 2013/0290746 A1* | 10/2013 | Lee | G06F 1/266 |
| | | | 713/300 |
| 2016/0179182 A1* | 6/2016 | Horie | G06F 1/1626 |
| | | | 713/323 |
| 2016/0266627 A1* | 9/2016 | Winand | G06F 1/266 |
| 2017/0115713 A1* | 4/2017 | Shin | G06F 1/266 |
| 2017/0126044 A1* | 5/2017 | Xu | H02J 7/0052 |

\* cited by examiner

METHODS AND SYSTEMS FOR AN ELECTRONIC DEVICE OPERABLE WITH AN ATTACHMENT THAT PREVENT CHARGING OF A PRIMARY ENERGY STORAGE DEVICE FROM POWER DELIVERED BY THE ATTACHMENT BASED UPON WHETHER THE ATTACHMENT IS OPERATING A FUNCTION

BACKGROUND

Technical Field

This disclosure relates generally to electronic devices, and more particularly to user electronic devices operable with attachments.

Background Art

Modern portable electronic devices are powerful computing systems. The processors in such devices are more powerful than giant supercomputers of the not too distant past. This advancement in technology has led to the use of portable electronic devices, including smartphones, tablet computers, gaming devices, and other devices, becoming ubiquitous. People use such devices to communicate with friends, family, and colleagues, manage calendars and contact lists, browse and explore the Internet, and play games, just to name a few of the features performed by such devices.

Power management within electronic devices is consistently a challenge. As technology develops, users frequently demand for lighter and thinner devices. Housing walls get thinner, as does the available volume within the device. This leaves less room for batteries and other energy storage devices. At the same time, consumers demand longer run times between charging cycles. It would be advantageous to have an improved power management system suitable for use in electronic devices offering advanced feature sets.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to the power management in an electronic device when a predefined function, or functions, associated with an attachment coupled to the electronic device are operating on the electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience by efficiently managing power delivery within an electronic device coupled to an attachment with a dedicated feature set to overcome problems specifically arising in the realm of the technology associated with electronic device/attachment interaction.

It will be appreciated that embodiments of the disclosure described herein may be comprised of one or more conventional processors and unique stored program instructions that control the one or more processors to implement, in conjunction with certain non-processor circuits, some, most, or all of the functions of managing power in an electronic device-attachment system as described herein. The non-processor circuits may include, but are not limited to, a radio receiver, a radio transmitter, signal drivers, clock circuits, power management control circuits, energy storage devices, and user input devices. As such, these functions may be interpreted as steps of a method to perform the management of power between an attachment and an electronic device when a dedicated feature performed by the attachment is operating, with a corresponding feature operating on the electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide systems and methods for managing power in an electronic device that is operating in tandem with an attachment having a predefined feature or feature set that the attachment performs. For example, the Moto Z.sup™ mobile phone, manufactured by Motorola Mobility LLC, offers a plurality of attachments that operate with the mobile phone. These attachments, referred to herein as "mods," have a predefined functionality, perform a predefined function, or execute a predefined feature set. Examples of these mods can be found at the following URL: https://www.motorola.com/us/moto-mods.

For example, in one embodiment the "mod" attached to the mobile device is an enhanced camera. Using a mod camera application on the electronic device, a user can control the enhanced camera of the mod to capture better photographs than would be possible with the smaller camera integrated in the electronic device.

In another embodiment, the mod is a game pad. When the mod is attached to the electronic device, the mod extends beyond the perimeter of the electronic device to provide physical buttons, control sticks, and action buttons. These provide a more tactile gaming experience than does a touch sensitive screen.

In another embodiment, the mod includes enhanced loudspeakers. When the mod is coupled to the electronic device, the enhanced loudspeakers can deliver audio that is louder and more immersive than would be possible with the smaller loudspeaker integrated into the electronic device. Mechanical features, such as a support or "kickstand," can also be built into the mod for optimal sound experience.

In yet another embodiment, the mod includes a projector. When the mod is coupled to the electronic device, a user can project images visible on the display on a projection surface to share those images with others. Using a companion application on the mobile device, the user can control the projector in the mod to project and/or stream movies, photos, and shows. These examples of attachments or mods, i.e., that perform an image capture or camera function, a gaming function, a music output function, or a video presentation function, are merely examples of attachments configured in accordance with one or more embodiments of the disclosure. Others will be described below. Still others will be obvious to those of ordinary skill in the art having the benefit of this disclosure.

In one or more embodiments, attachments operable with an electronic device include an auxiliary energy storage device. The term "auxiliary" is used because the primary energy storage device is disposed within the electronic device itself. Embodiments of the disclosure contemplate that some attachments, e.g., gaming function attachments, music output function attachments, and video presentation function attachments, consume relatively large amounts of power. Moreover, when these feature sets are operational, corresponding feature sets operating in the electronic device may consume more power than would be consumed when the electronic device was operating without the attachment.

Using a simple example, in one or more embodiments the predefined functionality of an attachment is that of video presentation function. The attachment may include a projector, for instance. A user, when the attachment is coupled to the electronic device, may want to stream a movie and project it on the wall. Accordingly, while the projector is operational, the electronic device will consume more power than normal.

This is true because a video presentation application, which corresponds with the predefined functionality of the attachment, will need to stream the movie, buffer it in memory, and deliver it to the projector. Moreover, the video presentation application may require that the display of the electronic device be continually ON rather than going to sleep. Accordingly, in one or more embodiments, when the projector attachment is working, a function associated with the functionality of the attachment, i.e., the video presentation application, will be operational on the electronic device and will consume large amounts of power.

Embodiments of the disclosure provide systems and methods for extending the operational run time of the electronic device. In one or more embodiments, one or more processors detect a function associated with an attachment having a predefined functionality operating on the electronic device. Continuing the example from above, the function would be the video presentation application, which is associated with the predefined functionality of the projector associated with the attachment. In one or more embodiments, when the function is operational on the electronic device, the one or more processors send a software command to a control circuit of the attachment to cause an auxiliary energy storage device carried by the attachment to deliver power to the electronic device.

Embodiments of the disclosure contemplate that if this delivered power is used to charge the primary energy storage device of the electronic device, the "battery meter" present on the display will be affected. For instance, if the auxiliary energy storage device delivers power to the electronic device, and that power is used to charge the battery, an energy storage level presented on the display will show increasing amounts of energy. Embodiments of the disclosure contemplate that this may be confusing to a user. Accordingly, in one or more embodiments, when the function is operational on the electronic device, a power management control circuit carried by the electronic device uses power delivered from the auxiliary energy storage device to power the one or more processors of the electronic device. At the same time, to avoid misinformation being presented by the battery meter, in one or more embodiments the power management control circuit precludes charging of the primary energy storage device carried by the electronic device with the power delivered from the auxiliary energy storage device. This preclusion leaves the battery meter unaffected, while extending the overall run time of the electronic device by powering the same with energy stored in the attachment.

In effect, the one or more processors of the electronic device are able to initiate and terminate, via software commands or other signals delivered to control circuits of the attachment, power sharing when the feature set of the attachment is operational. Advantageously, the methods and systems described herein use the energy stored in the attachment only for attachment feature related functions. By preserving the energy stored in the auxiliary energy storage device for attachment functionality, that energy is more likely to be available for use when the attachment is operational. Other advantages will be described in more detail below. Still others will be obvious to those of ordinary skill in the art having the benefit of this disclosure.

Figure 1:
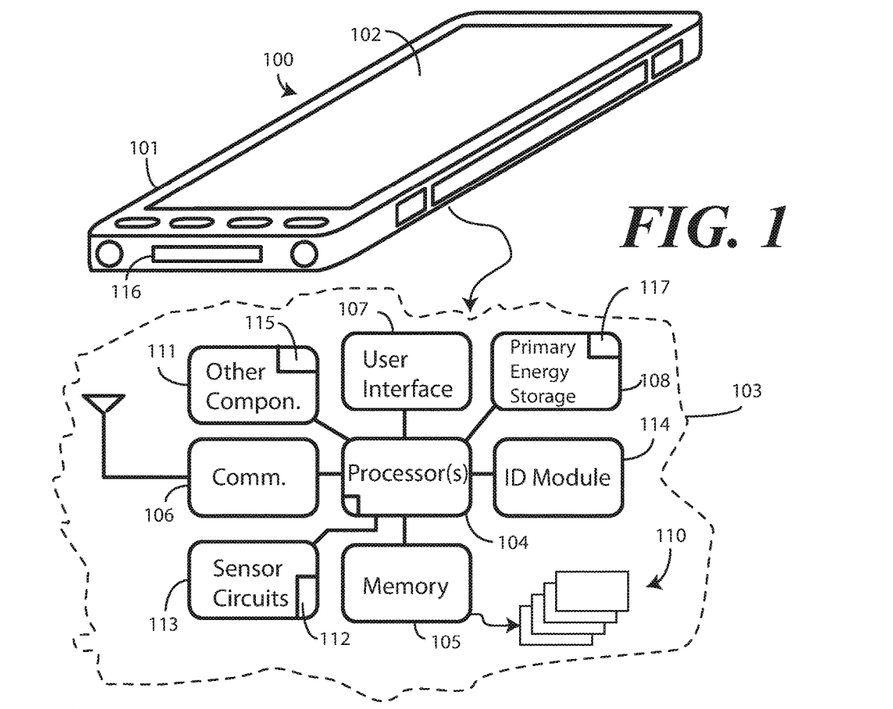
FIG. 1 illustrates one explanatory electronic device in accordance with one or more embodiments of the disclosure.

Turning now to FIG. 1, illustrated therein is one explanatory electronic device 100 in accordance with one or more embodiments of the disclosure. The electronic device 100 of FIG. 1 is shown as a portable electronic device. For ease of illustration, the electronic device 100 of FIG. 1 is shown illustratively as a smartphone. However, the electronic device 100 can take other forms as well, including as a palm top computer, a gaming device, a laptop computer, a multimedia player, and so forth. Still other examples of electronic devices will be obvious to those of ordinary skill in the art having the benefit of this disclosure.

As will be described in more detail below, in one or more embodiments the electronic device 100 is selectively attachable and detachable from an attachment. In one or more embodiments, the attachment includes an auxiliary energy storage device. In one or more embodiments, the attachment has a predefined function that it performs. For example, in one embodiment the predefined function is a camera function. In another embodiment, the predefined function is a music output function. In still another embodiment, the predefined function is gaming function. In yet another embodiment, the predefined function is a video presentation function. Other predefined functions will be obvious to those of ordinary skill in the art having the benefit of this disclosure.

The auxiliary energy storage device can be a traditional charging device such as a charger or power supply disposed within the attachment. However, in one or more embodiments, the auxiliary energy storage device is an electrochemical cell disposed within an attachment that mechanically and electrically couples to the electronic device 100. The attachment becomes a "module" or "mod" that attaches to the electronic device 100 to increase functionality or the range of features by adding the predefined function in one or more embodiments.

In one or more embodiments, the electronic device 100 includes a housing 101. The housing 101 can include one or more housing portions, such as a first housing portion and a second housing portion. In this illustrative embodiment, the housing 101 is disposed about the periphery of a display 102, thereby defining a major face of the electronic device 100.

The electronic device can include one or more circuit components 103, as shown in FIG. 1. In one embodiment, the electronic device 100 includes one or more processors 104. The one or more processors 104 are operable with the display 102 and other components of the electronic device 100. The one or more processors 104 can include a microprocessor, a group of processing components, one or more ASICs, programmable logic, or other type of processing device. The one or more processors 104 can be operable with the various components of the electronic device 100. The one or more processors 104 can be configured to process and execute executable software code to perform the various functions of the electronic device 100.

A storage device, such as memory 105, can optionally store the executable software code used by the one or more processors 104 during operation. The memory 105 may include either or both static and dynamic memory components, may be used for storing both embedded code and user data. The software code can embody program instructions and methods to operate the various functions of the electronic device 100, and also to execute software or firmware applications and modules. The one or more processors 104 can execute this software or firmware, and/or interact with modules, to provide device functionality.

In one or more embodiments the electronic device 100 includes a display 102, which may optionally be touch-sensitive. In one embodiment where the display 102 is touch-sensitive, the display 102 can serve as a primary user interface 107 of the electronic device 100. Users can deliver user input to the display 102 of such an embodiment by delivering touch input from a finger, stylus, or other objects disposed proximately with the display. In one embodiment, the display 102 is configured as an organic light emitting diode (OLED) display. However, it should be noted that other types of displays would be obvious to those of ordinary skill in the art having the benefit of this disclosure. In one embodiment, the display 102 includes an electroluminescent layer or light-emitting diode (LED) backlighting layer disposed beneath the display 102 to project light through the display 102. The display 102 can adaptively present text, graphics, images, user actuation targets, data, and controls along the display surface.

In this illustrative embodiment, the electronic device 100 also includes an optional communication circuit 106 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 106 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 106 can include wireless communication circuitry, one of a receiver, a transmitter, or transceiver, and one or more antennas.

The one or more processors 104 can be responsible for performing the primary functions of the electronic device 100. For example, in one embodiment the one or more processors 104 comprise one or more circuits operable with one or more user interface devices, which can include the display 102, to present presentation information to a user. The executable software code used by the one or more processors 104 can be configured as one or more modules 110 that are operable with the one or more processors 104. Such modules 110 can store instructions, control algorithms, and so forth. While these modules 110 are shown as software stored in the memory 105, they can be hardware components or firmware components integrated into the one or more processors 104 as well.

A primary energy storage device 108 can serve as a principal energy delivery device for the electronic device 100. In one or more embodiments, the primary energy storage device 108 comprises a rechargeable battery having one or more electrochemical cells. The electrochemical cells can be any of lithium-ion cells, lithium-polymer cells, nickel-metal-hydride cells, or other types of rechargeable cells.

In one or more embodiments, the primary energy storage device 108 includes a memory 117. Information can be written to the memory 117, including the rated discharge voltage of the one or more cells of the primary energy storage device 108, the voltages of the one or more cells of the primary energy storage device 108 when charging commences, and when and how frequently the one or more cells of the primary energy storage device 108 should be charged. In one or more embodiments, the memory 117 of the primary energy storage device 108 can be an electrically erasable programmable read only memory, although other suitable types of memory devices can also be used with the primary energy storage device 108.

Other components 111 can be included with the electronic device 100. The other components 111 can be operable with the one or more processors 104 and can include input and output components associated with a user interface 107, such as power inputs and outputs, audio inputs and outputs, and/or mechanical inputs and outputs. The other components 111 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 111 can include a power management control circuit 115 configured to regulate energy delivery to the primary energy storage device 108. Illustrating by example, the power management control circuit 115 can include a charging circuit that is electrically coupled to the primary energy storage device 108. When an auxiliary energy storage device, which will be described in more detail below, delivers a charging current to the power management control circuit 115, it can regulate levels of current, whether current is flowing, and so forth. As will be shown below with reference to FIG. 6, in one or more embodiments the power management control circuit 115 can selectively deliver power received at a connector 116 to one or both of the primary energy storage device 108 or the one or more processors 104 and corresponding circuit components.

In one or more embodiments, the connector 116 is a Universal Serial Bus (USB) type connector. For example, the connector 116 can be a USB A-type connector, a USB B-type connector, a USB C-type connector, a Micro USB A or B type connector, a USB mini connector, or other type of connector. In other embodiments, as will be described below with reference to FIG. 3, the backside of the electronic device 100 includes a connector array. The connector array is located and configured to mate with a mating connector array on the front side of an attachment. In such a configuration, the power management control circuit 115 can selectively deliver power received at the connector array to one or both of the primary energy storage device 108 or the one or more processors 104 and corresponding circuit components.

The power management control circuit 115 can include, for example, a control circuit configured to control the amount of charging current that flows to the primary energy storage device 108 and/or the one or more processors 104 and corresponding circuit components. Additionally, the power management control circuit 115 can also be configured to monitor a discharge profile, charging profile, charging temperature, discharge temperature, and other characteristics of the electrochemical cells of the primary energy storage device 108.

One or more sensor circuits 113 are operable with the one or more processors 104 in one or more embodiments. These sensor circuits 113 can include one or more energy delivery sensors 112. In one or more embodiments, the energy delivery sensors 112 are operable to detect when, and optionally how much, energy is being delivered to the connector 116 and the power management control circuit 115.

Illustrating by example, the energy delivery sensors 112 can include a sense resistor, Hall effect sensor, or other sensor to detect current flowing to the connector 116 and the power management control circuit 115. The energy delivery sensors 112 can optionally include current control devices as well, such as a field effect transistor and a diode. The power management control circuit 115 can optionally allow, terminate, and/or control energy delivery from the connector to one or both of the primary energy storage device 108 and/or the one or more processors 104 using these components.

The energy delivery sensors 112 can include other components such as a thermistor. Where a thermistor is included, the one or more processors 104 can monitor a temperature of electrochemical cells in the primary energy storage device 108 using the thermistor. Still other components suitable for inclusion with the energy delivery sensors 112 will be obvious to those of ordinary skill in the art having the benefit of this disclosure.

The one or more sensor circuits 113 can also be configured to sense or determine physical parameters indicative of conditions in an environment about the electronic device 100. Illustrating by example, the physical sensors can include devices for determining information such as motion, bearing, location, acceleration, orientation, proximity to people and other objects, incident light amounts, and so forth. The one or more sensor circuits 113 can include various combinations of microphones, location detectors, motion sensors, physical parameter sensors, temperature sensors, barometers, proximity sensor components, proximity detector components, wellness sensors, touch sensors, cameras, audio capture devices, and so forth.

The one or more sensor circuits 113 can also include a touch pad sensor, a touch screen sensor, a capacitive touch sensor, and one or more switches. The one or more sensor circuits 113 can also include audio sensors and video sensors (such as a camera). The one or more sensor circuits 113 can also include motion detectors, such as one or more accelerometers or gyroscopes. The motion detectors can detect movement, and direction of movement, of the electronic device 100 by a user. The one or more sensor circuits 113 can also be used to detect gestures. For example, the other one or more sensor circuits 113 can include one or more proximity sensors that detect the gesture of a user waving a hand above the display 102. In yet another embodiment, the accelerometer can detect gesture input from a user lifting, shaking, or otherwise deliberately moving the electronic device 100. It should be clear to those of ordinary skill in the art having the benefit of this disclosure that additional sensors can be included as well. Moreover, other types of sensor circuits 113 will be obvious to those of ordinary skill in the art having the benefit of this disclosure.

An optional identification module 114 can be configured to determine whether an attachment, the details of which will be described below with reference to subsequent figures, is coupled to the electronic device 100. In one or more embodiments, the identification module 114 can detect not only whether an attachment is coupled to the electronic device 100, but the type of attachment as well. For example, where the attachment has a predefined function associated therewith of image projection capabilities by way of the inclusion of a projector in the attachment, the identification module 114 can determine this and distinguish the attachment from another attachment, such as one with gaming functions as its predefined functionality. Similarly, where the predefined functionality associated with an attachment is that of an image capture or camera function, the identification module 114 can determine the type of camera included with the attachment.

Illustrating by example, in one embodiment the identification module 114 is operable with multiple mechanical connectors to determine which are engaged to identify the attachment. Where the attachment is electrically coupled to the electronic device 100, in one embodiment the identification module 114 can identify the attachment by exchanging electrical signals with a control circuit of the attachment. These electrical signals can correspond to the predefined function performed by the attachment. For instance, if the attachment includes a projector, the electrical signals can request video image information from the electronic device 100 for delivery to the projector, and so forth. Other techniques for identifying an attachment will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 2:
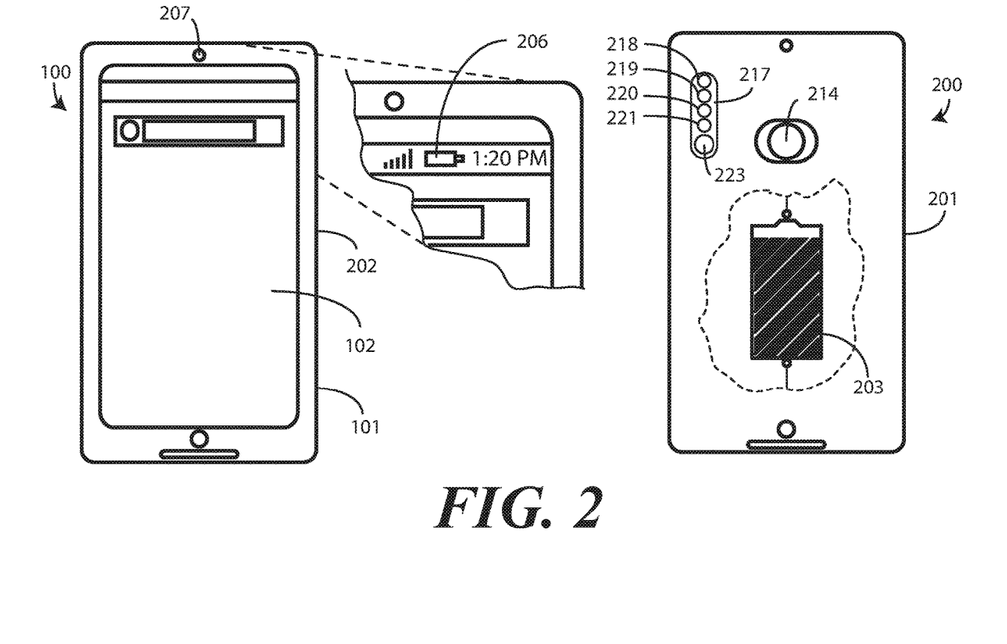
FIG. 2 illustrates one explanatory modular system in accordance with one or more embodiments of the disclosure, with an electronic device and an attachment.

Turning now to FIG. 2, illustrated therein is one explanatory system 200 in accordance with one or more embodiments of the disclosure. In one or more embodiments, the system 200 includes one of an electronic device 100 and an attachment 201. In one or more embodiments, the attachment 201 can be selectively attached to, or detached from, the electronic device 100 or an electronic device module.

As the principal components of the electronic device 100 were explained above with reference to FIG. 1, attention will now be directed to the attachment 201. In one or more embodiments, the attachment includes a housing 202. In one or more embodiments, the housing 202 is selectively attachable to the electronic device 100 by one or more coupling devices.

In one or more embodiments, the housing 202 of the attachment 201 can be mechanically attached to the electronic device 100. For example, mechanical clasps for the attachment 201 can be configured to wrap about, or engage, the housing 101 of the electronic device 100, thereby retaining the attachment 201 against a surface of the housing 101. Such clasps permit the attachment 201 to be completely detached from the electronic device 100 and treated as an accessory.

In another embodiment, when not in use, the attachment 201 may be mechanically retained to the electronic device 100 by a lanyard or similar device. Such a configuration helps to prevent inadvertent loss of the attachment 201 when detached from the housing 101 of the electronic device 100.

In yet another embodiment, the attachment 201 may be coupled to the electronic device 100 by a hook and slider mechanism so as to be detachable from the housing 101 yet non-detachable from the electronic device 100 itself. Other attachment mechanisms include magnetic couplings, snaps, protective casing couplings, boot couplings, static attachment connectors, vertical locators, horizontal locators, and the like. Some of these various mechanical configurations will be illustrated in more detail below. These mechanical embodiments are intended to be illustrative only. As an alternate to mechanical attachments, the attachment 201 can be attached to the housing 101 using static adhesion, mechanical suction, or in other ways.

In one or more embodiments, the attachment 201 has a predefined function that it primarily performs. Said differently, in one or more embodiments the attachment 201 is configured, via hardware and software, to perform a predefined functionality. For example, in the illustrative embodiment of FIG. 2, the predefined function or predefined functionality is that of an enhanced camera due to the fact that the attachment 201 includes an enhanced camera 214 or other image capture device to enhance electronic device operation by facilitating the capture of enhanced images. In this embodiment, the camera 214 is carried on the housing 202 of the attachment 201 to provide an enhanced functionality for the electronic device 100.

In other embodiments, the camera 214 can be replaced by other components that provide other predefined functions or predefined functionalities. For example, in another embodiment the camera 214 is replaced with enhanced loudspeakers. (Note that where this is the case, the location of the enhanced loudspeakers may change from that of the camera 214 shown in FIG. 2.) Where so configured, the enhanced loudspeakers of the attachment 201 can deliver audio that is louder and more immersive than would be possible with the smaller loudspeaker 207 integrated into the electronic device 100. Other mechanical features, such as a support or "kickstand," can also be built into the attachment 201 for optimal sound experience.

In still another embodiment, the camera 214 is replaced with a projector. (Note that where this is the case, the location of the projector may change from that of the camera 214 shown in FIG. 2.) When the attachment 201 is coupled to the electronic device 100, a user can project images visible on the display 102 on a projection surface to share those images with others. Using a companion application on the electronic device 100, the user can control the projector in the attachment 201 to project and/or stream movies, photos, and shows.

In yet another embodiment, the camera 214 can be replaced or augmented with the addition of physical buttons, control sticks, and action buttons so that the attachment 201 becomes one with gaming functions or functionality. These examples of attachments are merely examples of attachments configured in accordance with one or more embodiments of the disclosure. Others will be obvious to those of ordinary skill in the art having the benefit of this disclosure.

In one or more embodiments, the attachment 201 comprises at least one auxiliary energy storage device 203. In the illustrative embodiment of FIG. 2, the auxiliary energy storage device 203 comprises a thermal electrochemical cell. Examples of electrochemical cells include a lithium-ion cell, a lithium-polymer cell, or a nickel-metal-hydride cell. Still other types of electrochemical cells will be obvious to those of ordinary skill in the art having the benefit of this disclosure. The auxiliary energy storage device 203 can include one or multiple electrochemical cells. Where multiple electrochemical cells are included, they can be coupled in series, in parallel, or combinations thereof.

In one or more embodiments, the attachment 201 also includes an energy capacity indicator 217 that is operable with the auxiliary energy storage device 203. In this illustrative embodiment, the energy capacity indicator 217 comprises a plurality of lights 218, 219, 220, 221, each of which is configured as a light emitting diode. In one embodiment the energy capacity indicator 217 is to present a visible indication to the user that is indicative of the amount of energy stored in the auxiliary energy storage device 203 when a button 223 is pressed. The energy capacity indicator 217 may be configured to convey other information as well, such as indicating that energy sharing is occurring with the electronic device 100.

In one or more embodiments, the electronic device 100 also includes an energy capacity indicator 206. In this embodiment, the energy capacity indicator 206 is presented on the display 102 and comprises a graphical representation of the primary energy storage device (108). This energy capacity indicator 206, also referred to as a "power meter," presents a visible indication to the user that is indicative of the amount of energy stored in the primary energy storage device 108.

Figure 3:
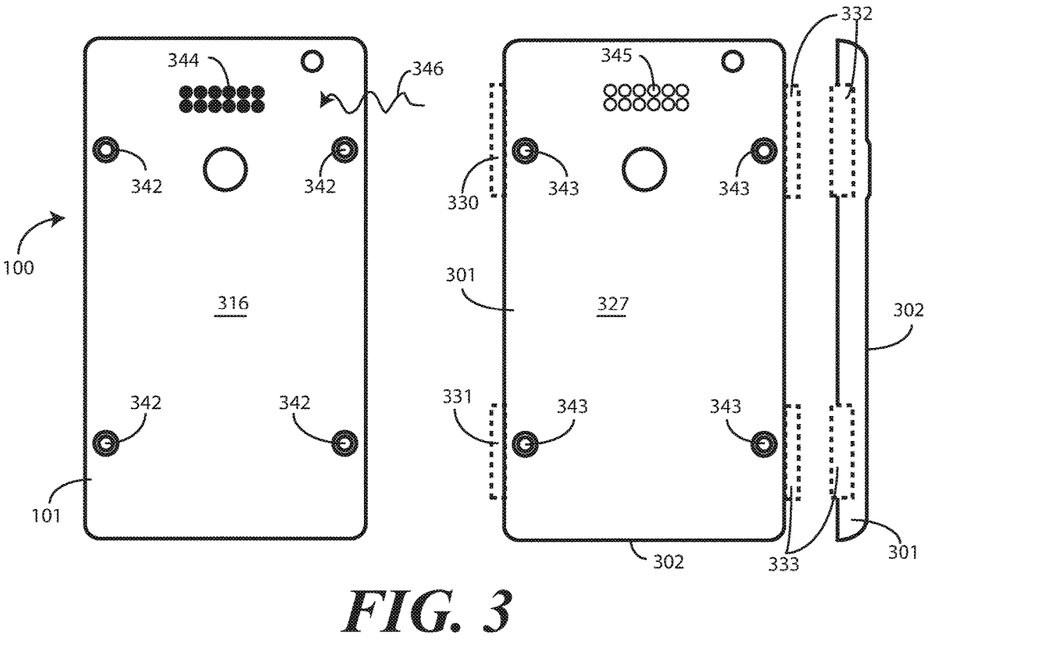
FIG. 3 illustrates another explanatory system in accordance with one or more embodiments of the disclosure.

Turning now to FIG. 3, illustrated therein are examples of various ways in which an attachment 301 can be coupled to an electronic device 100 in accordance with one or more embodiments of the disclosure. As noted above, in one or more embodiments of the disclosure, the attachment 301 can be coupled to the electronic device 100 by mechanical, magnetic, suction, static, and other techniques.

As shown in FIG. 3, the backside 316 of the electronic device 100 can interface with the front side 327 of one explanatory attachment 301 configured in accordance with one or more embodiments of the disclosure. As before, the attachment 301 includes a housing 302 that carries an auxiliary energy storage device. The backside 316 of the electronic device 100 defines a major face of the electronic device 100. The front side 327 of the attachment 301, which defines a major face of the attachment 301, can be selectively attachable to this major face of the electronic device 100 in one or more embodiments.

Figure 4:
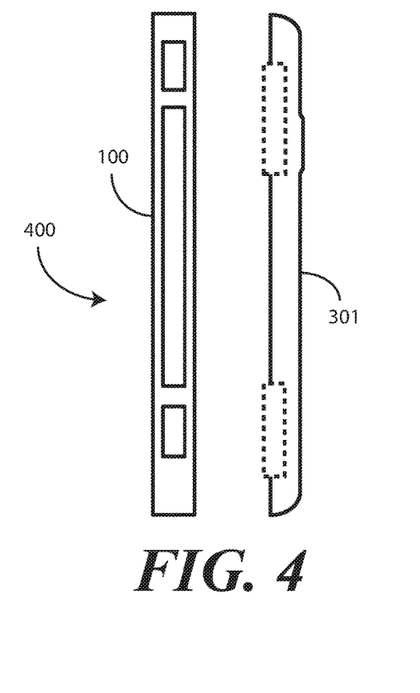
FIG. 4 illustrates another explanatory system, with one embodiment of an attachment detached from an electronic device in accordance with one or more embodiments of the disclosure.
Figure 5:
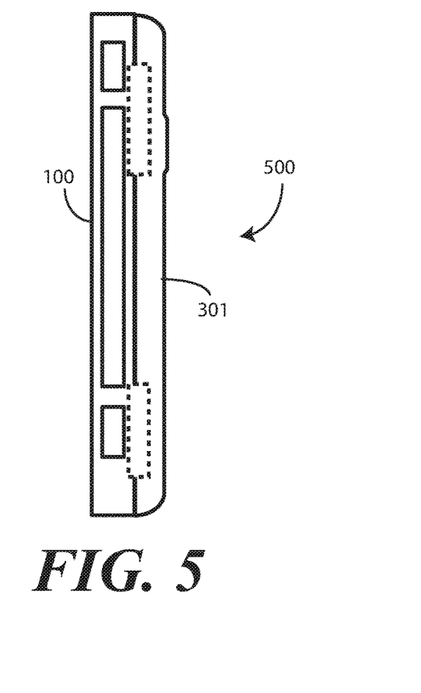
FIG. 5 illustrates the explanatory system of FIG. 4, but with the attachment coupled to the electronic device in accordance with one or more embodiments of the disclosure.

In one or more embodiments, the housing 302 of the attachment 301 can be mechanically attached to the electronic device 100 or an electronic device module by one or more coupling devices. In one illustrative embodiment, the coupling devices comprise mechanical clasps 330, 331, 332, 333 that are configured to wrap about, or engage, the housing 101 of the electronic device 100, thereby retaining the attachment 301 against the major surface defined by the back side 316 of the housing 101. Such mechanical clasps 330, 331, 332, 333 permit the attachment 301 to be completely detached from the electronic device 100 and treated as a separate accessory. In FIG. 4, the attachment 301 is shown detached from the electronic device 100, while in FIG. 5 the attachment 301 is shown attached to the electronic device 100 to form a system 500.

Other coupling systems may be used instead of, or in conjunction with, the mechanical clasps 330, 331, 332, 333. Illustrating by example, the backside 316 of the electronic device 100 can include one or more alignment features 342 configured and placed to mate with complementary mating features 343 on the front side 327 of the attachment 301. In one or more embodiments, the alignment features 342 and complementary mating features 343 are magnetic such that the front side 327 of the attachment 301 can be magnetically adhered to the backside 316 of the electronic device 100. Attachments configured in accordance with one or more embodiments of the disclosure can be coupled to electronic devices in other ways as well. These include snaps, protective casing couplings, boot couplings, static attachment connectors, vertical locators, horizontal locators, static adhesion devices, mechanical suction devices, or other devices.

In one embodiment the backside 316 of the electronic device 100 includes a connector array 344. The connector array 344 is located and configured to mate with a mating connector array 345 on the front side 327 of the attachment 301. Electrical signals 346, software commands, power and/or a charging current can be delivered from the electronic device 100 to circuit components (described below with reference to FIG. 6) disposed within the attachment 301 using the connector array 344 and the mating connector array 345. Illustrating by example, in one or more embodiments the one or more processors (104) of the electronic device 100 can selectively actuate the delivery of energy, voltage, and/or current from the auxiliary energy storage device (203) to the connector array 344.

Figure 6:
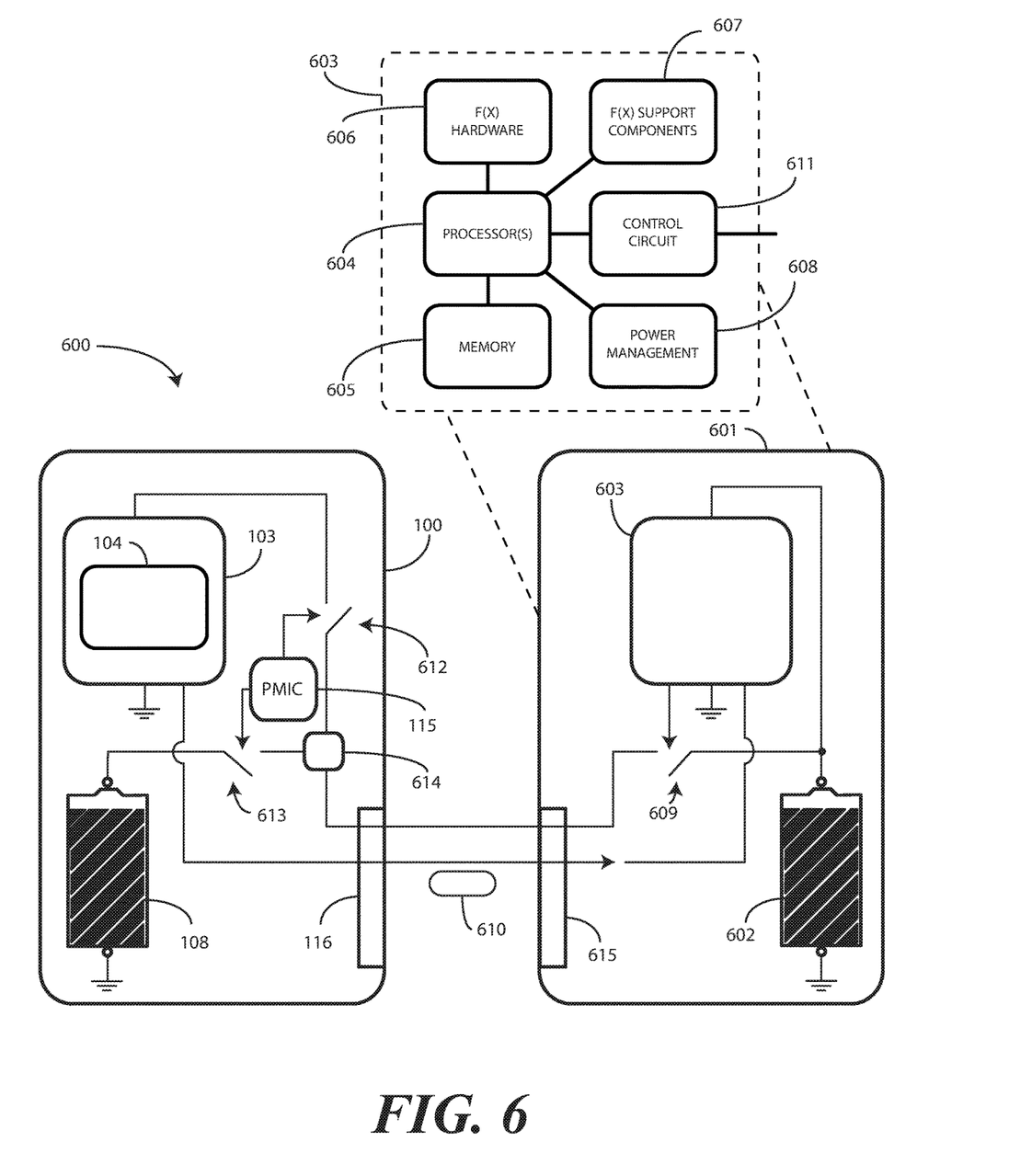
FIG. 6 illustrates another explanatory modular system in accordance with one or more embodiments of the disclosure.

Turning now to FIG. 6, illustrated therein is a more detailed schematic diagram of one explanatory system 600 configured in accordance with one or more embodiments of the disclosure. As before, the system 600 includes an electronic device 100 and an attachment 601 that performs a predefined function, or has a predefined functionality, and that includes an auxiliary energy storage device 602. In the embodiments of FIG. 6, the attachment 601 is coupled to the electronic device 100, with an attachment connector 615 coupled to the connector 116 of the electronic device 100.

The attachment 601 can include one or more circuit components 603. Illustrating by example, in one embodiment, the attachment 601 includes one or more processors 604. The one or more processors 604 are operable with other circuit components 603 of the attachment 601. The one or more processors 604 can include one or more control circuits, a microprocessor, a group of processing components, one or more ASICs, programmable logic, or other type of processing devices. The one or more processors 604 can be configured to process and execute executable software code to perform the various predefined functions of the attachment 601 that provide its characteristic functionality.

A storage device, such as memory 605, can optionally store the executable software code used by the one or more processors 604 during operation. The memory 605 may include either or both static and dynamic memory components, may be used for storing both embedded code and user data. The software code can embody program instructions and methods to operate the various functions of the attachment 601, and also to execute software or firmware applications and modules. The one or more processors 604 can execute this software or firmware, and/or interact with modules, to provide attachment functionality.

As noted above, in one or more embodiments the attachment 601 functions with a predefined feature set. In one or more embodiments, this predefined feature set or functionality is defined by one or more hardware and software components. The software components can be stored in the memory 605 for execution by the one or more processors 604.

In one or more embodiments, the hardware components include predefined function hardware 606. Said differently, in one or more embodiments the attachment 601 comprises one or more circuits defining the predefined function that the attachment 601 performs. For example, where the predefined feature set comprises a camera function, the predefined function hardware 606 may comprise a camera. Where the predefined feature set comprises a gaming function, the predefined function hardware 606 may include physical buttons, control sticks, and action buttons, and so forth. Where the predefined feature set comprises a music output function, the predefined function hardware 606 may comprise one or more loudspeakers. Where the predefined feature set comprises a video presentation function, the predefined function hardware 606 may comprise one or more projectors.

Function support circuitry 607 may support the predetermined feature set. For example, where the predefined feature set comprises a video presentation function, the function support circuitry 607 may comprise one or more video processing circuits. Where the predefined feature set comprises a music output function, the function support circuitry 607 may comprise one or more digital signal processors, and so forth.

The circuit components 603 of the attachment 601 can also include a power management control circuit 608. The power management control circuit 608 can regulate energy delivery to, and from, the auxiliary energy storage device 602 in one or more embodiments. Illustrating by example, the power management control circuit 608 can include a charging circuit that is electrically coupled to the auxiliary energy storage device 602. The power management control circuit 608 can regulate levels of current, whether current is flowing, and so forth. The power management control circuit 608 can include, for example, a control circuit configured to control the amount of charging current that flows to the auxiliary energy storage device 602. Additionally, the power management control circuit 608 can also be configured to monitor a discharge profile, charging profile, charging temperature, discharge temperature, and other characteristics of the electrochemical cells of the auxiliary energy storage device 602.

In one or more embodiments, the circuit components 603 of the attachment 601 include a control circuit 611 to control a switch 609 operable to deliver power, in the form of voltage and current, to the connector 116 of the electronic device 100. In one or more embodiments, the one or more processors 104 of the electronic device 100 can transmit software commands 610 or other electronic signals to the connector 116, which are then delivered to the control circuit 611 to cause the switch 609 to open or close. Said differently, in one or more embodiments the one or more processors 104 of the electronic device 100 can send a software command 610 to the control circuit 611, which is operable with the auxiliary energy storage device 602, to cause the control circuit 611 to selectively deliver power from the auxiliary energy storage device 602 by opening or closing the switch 609.

As noted above, the electronic device 100 also includes a power management control circuit 115, which is shown in FIG. 6. The power management control circuit 115 configured to regulate energy delivery to the primary energy storage device 108. In this illustrative embodiment, the power management control circuit 115 is operable with a first switch 612 and a second switch 613. When the first switch 612 is closed by the power management control circuit 115, power delivered to the connector 116 flows to the circuit components 103 of the electronic device 100 to power those circuit components 103. When the power management control circuit 115 closes the second switch 613, power delivered to the connector 116 flows to the primary energy storage device 108 to charge the same. Power conversion circuitry 614 can be operable with the power management control circuit 115 within the electronic device 100 to converting, for example, a first voltage present at the connector 116 to a second voltage prior to powering of the one or more processors 104, charging the primary energy storage device 108, or combinations thereof.

In one or more embodiments, the one or more processors 104 of the electronic device determine whether a predefined function corresponding to the dedicated function of the attachment 601 is operational at the electronic device 100. For example, where the predefined functionality of the attachment 601 is that of video presentation function due to the fact that the function hardware 606 include a projector, the predefined function corresponding to the dedicated function of the attachment 601 may be a video presentation application that streams video content, buffers it in memory, delivers it to the projector, and so forth.

In one or more embodiments, when the predefined function is operational on the one or more processors 104 of the electronic device 100, the one or more processors 104 deliver command signals, in this embodiment in the form of a software command 610, to the connector 116. Since the attachment 601 is coupled to the electronic device 100, this software command is delivered to the control circuit 611 of the attachment, thereby causing the switch 609 to close. This closing of the switch 609 causes delivery of the power to the connector 116 from the auxiliary energy storage device 602.

In one or more embodiments, when this occurs, the power management control circuit 115 of the electronic device 100 powers the circuit components 103 of the electronic device 100, including the one or more processors 104, with the power delivered from the auxiliary energy storage device 602 to the connector 116. However, to avoid user confusion at the power meter, in one or more embodiments the power management control circuit 115 prevents charging of the primary energy storage device 108 with the power delivered to the connector 116 from the auxiliary energy storage device 602. The power management control circuit 115 can do this by closing switch 612 and opening switch 613.

However, when the predefined function associated with the attachment 601 terminates on the electronic device 100, in one embodiment the one or more processors 104 detect this termination. When this termination is detected, in one or more embodiments the one or more processors 104, by delivering a command to the power management control circuit 115, cease the powering of the circuit components 103 of the electronic device 100 with power delivered from the auxiliary energy storage device 602 to the connector 116. In one or more embodiments the power management control circuit 115 accomplishes this by opening switch 612.

When this occurs, in one or more embodiments the one or more processors 104 deliver other command signals, herein the form of a software command 610, to the connector 116. This software command 610 is then communicated to the control circuit 611 of the attachment 601, thereby causing cessation of delivery of the power to the connector 116 from the auxiliary energy storage device 602.

Advantageously, this system 600 allows the attachment 601 to configure itself to deliver power from the auxiliary energy storage device 602 to the connector 116 of the electronic device 100. The power management control circuit 115 then configures the electronic device 100 to deliver the power the electronic device 100 needs for its circuit components 103 to operate the functions that allow the attachment 601 to provide its enhanced functionality. Since there is no charging, the battery meter is unaffected.

Since the one or more processors 104 of the electronic device 100 can identify the operational state of the electronic device 100 when the attachment 601 is coupled thereto, the one or more processors 104 can selectively deliver the software command 610 to the attachment 601 to cause the auxiliary energy storage device 602 to deliver, or not deliver, power to the connector 116.

The selective powering of the circuit components 103 of the electronic device 100 with power from the auxiliary energy storage device 602, but only when the circuit components 103 are supporting the predefined function of the attachment 601, offers several advantages over prior art systems. First, this solution reserves the stored energy of the auxiliary energy storage device 602 for use only in supporting attachment 601 functionality. Second, since the circuit components 103 of the electronic device 100 are being powered, but without the primary energy storage device 108 charging, the user will not be confused by charging information or other information present on the power meter, i.e., the energy capacity indicator (206), presented on the display (102).

Figure 7:
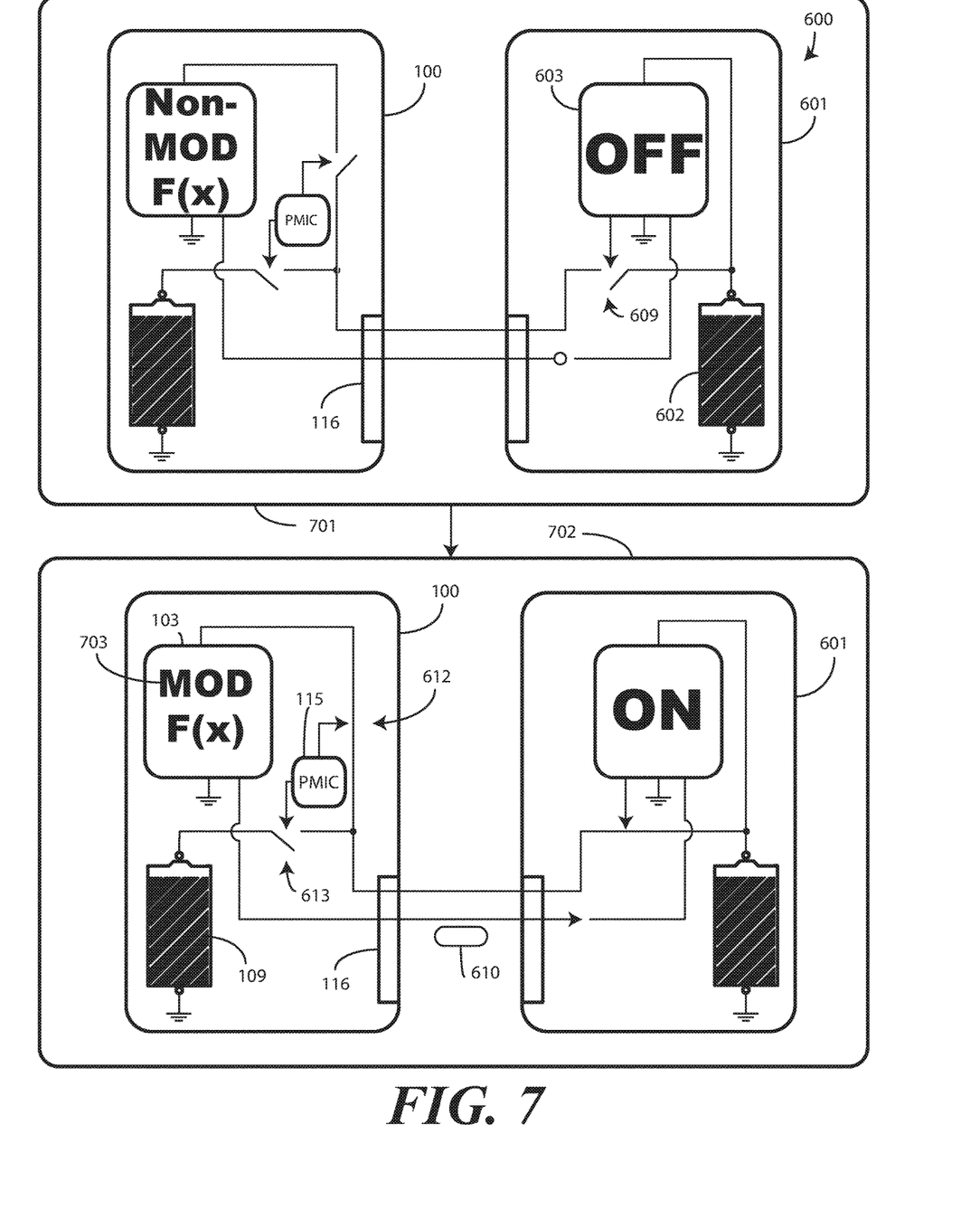
FIG. 7 illustrates one or more method steps in accordance with one or more embodiments of the disclosure.

Turning now to FIG. 7, illustrated therein are one or more method steps for performing this "power but don't charge when supporting attachment functionality" method using a system 600 configured in accordance with one or more embodiments of the disclosure. Beginning with step 701, the system 600 includes an electronic device 100 coupled to an attachment 601. The attachment 601 has a predefined functionality, which in this case is a video presentation function. At step 701, the attachment's predefined functionality is not operational due to the fact that a user has not elected, through the user interface (107) of the electronic device 100, to project any images. Accordingly, the circuit components 603 of the attachment 601 are idle. Further no companion functionality, e.g., a video presentation application configured to be operable with the projector of the attachment 601, is operational on the electronic device 100.

Since no companion functionality is operational on the electronic device 100 due to the fact that the predefined functionality of the attachment 601 is not in use, no power from the auxiliary energy storage device 602 is being delivered to the connector 116 of the electronic device 100. Said differently, switch 609 is open.

At step 702, the one or more processors (104) of the electronic device 100 detect that the companion functionality 703, i.e., a predefined function performed in conjunction with the attachment 601, is operational on the electronic device 100. Where this predefined function is operational on the electronic device 100, in one or more embodiments the one or more processors (104) cause, by delivering command signals to the attachment 601, the auxiliary energy storage device 602 carried by the attachment 601 to deliver power to the connector 116 of the electronic device 100. The power management control circuit 115 carried by the electronic device 100 then powers the circuit components 103, including the one or more processors (104) with the power delivered from the auxiliary energy storage device 602 by closing switch 612 to support attachment functionality. Illustrating by example, the power management control circuit 115 can power the one or more processors (104) with the power delivered from the auxiliary energy storage device 602 while the one or more processors (104) are delivering images to the projector of the attachment 601 for projection on a surface.

At the same time, in one or more embodiments the one or more processors (104) preclude charging of the primary energy storage device 108 carried by the electronic device 100 with the power delivered from the auxiliary energy storage device 602 when the predefined function is operational on the electronic device 100 by causing the power management control circuit 115 to open switch 613. This prevents confusion for the user by leaving the power meter present on the display unaffected.

However, when the predefined function is not operational, the method returns to step 701. Here, the one or more processors (104) prevent the delivery of power from the auxiliary energy storage device 602 to the electronic device 100 to preserve that stored energy for attachment functionality in the future, as previously described.

Figure 8:
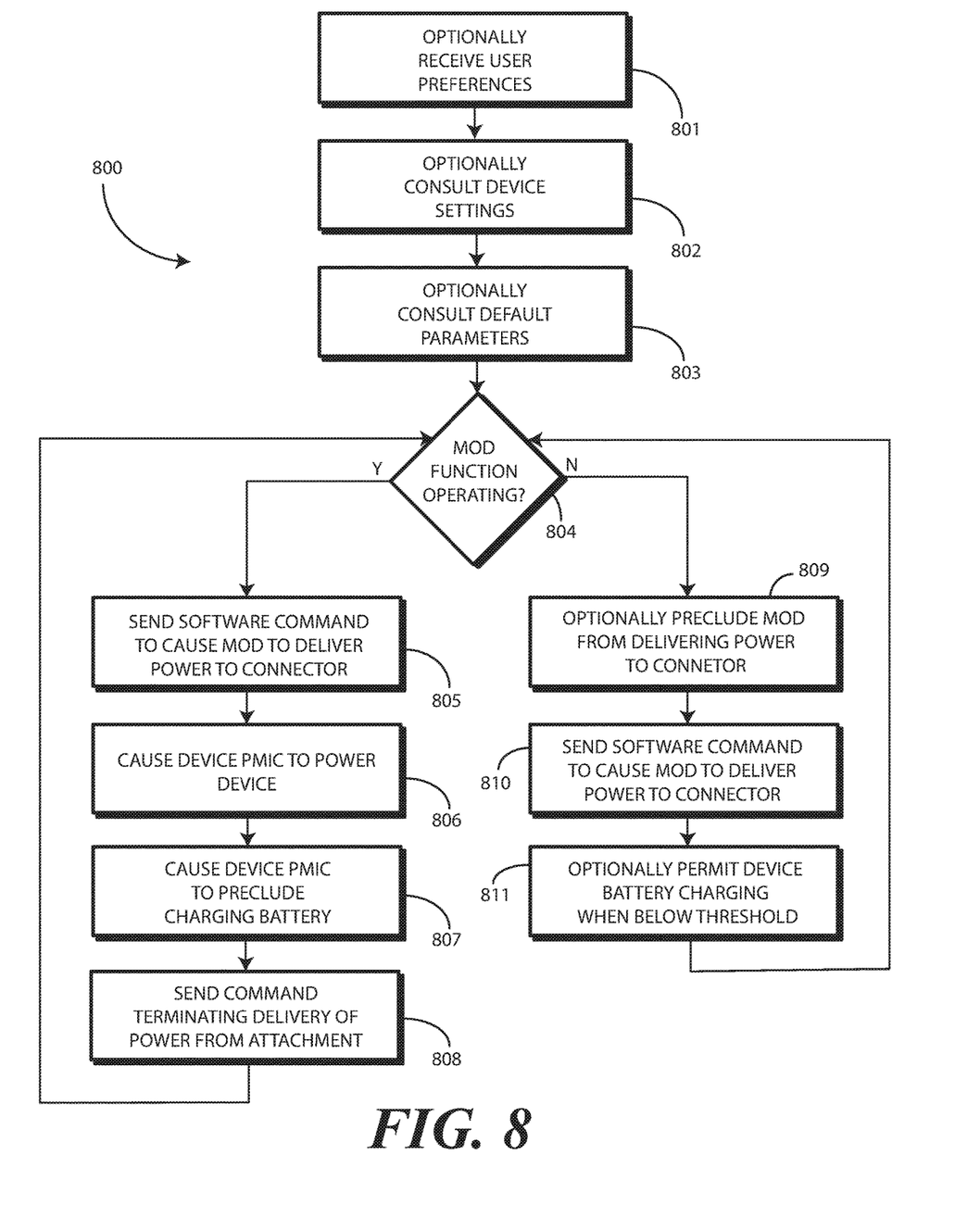
FIG. 8 illustrates one explanatory method in accordance with one or more embodiments of the disclosure.

Turning now to FIG. 8, illustrated therein is a method 800 for performing power management operations in an electronic device configured in accordance with one or more embodiments of the disclosure. As in the examples set forth above, the electronic device is operable with an attachment. In one or more embodiments, the attachment has a predefined functionality associated therewith that extends or enhances the functionality of the electronic device itself. As noted above, examples include providing an enhanced camera, better loudspeakers, gaming controls, enhanced sensor circuits, projectors, and the like. Other predefined functionality suitable for integration into an attachment will be obvious to those of ordinary skill in the art having the benefit of this disclosure.

Beginning at step 801, the method 800 optionally receives one or more user preferences. To this point, one or more processors of the electronic device have automatically caused power delivery from the attachment, as well as powering of the circuit components of the electronic device without charging the battery, when a companion application or other function corresponding to the predefined functionality of the attachment becomes operational on the electronic device. In most situations, this is the default option as it both preserves energy stored in the attachment for attachment functions and extends the overall run time of the system.

However, in other embodiments, the user may deliver preferences to a user interface of the electronic device to override, adjust, or otherwise modify these default settings. For example, a user whose electronic device is operating with an enhanced camera attachment may want the supplemental energy storage device disposed within the attachment to power the circuit components of the electronic device for all picture taking, not just those taken with the enhanced camera of the attachment. User preferences indicating this can be received at step 801. Alternatively, the user may want the supplemental energy storage device disposed within the attachment to power the circuit components of the electronic device all the time, thus using the attachment not only as an enhanced camera, but as a power supply as well. Such user preferences can be received at step 801. Thus, in one or more embodiments, the user preferences received at step 801 can actually define the function that triggers power delivery from the attachment.

At step 802, these user preferences can be considered by the one or more processors, as they can alter the performance of the remaining steps of the method 800. Where the user preferences received at step 801 and consulted at step 802 are not present, the method 800 can consult the default parameters at step 803. In one or more embodiments, the default parameters comprise automatically causing power delivery from the attachment, as well as powering of the circuit components of the electronic device without charging the battery, when a companion application or other function corresponding to the predefined functionality of the attachment becomes operational on the electronic device.

At decision 804, the method 800 detects, with one or more processors of the electronic device operating with the attachment with the predefined functionality, whether a function of the predefined functionality is operational on the electronic device. The function can be a companion application, the presentation of output from the attachment on the display, the presentation of controls for the attachment on the display, and so forth. Where the function is operational on the electronic device, the method 800 moves to step 805. Where the function is not operational, the method 800 can optionally move to steps 810-811. Alternatively, the method 800 can return to step 801.

At step 805, the method 800 sends, by the one or more processors, a software command to a control circuit carried by the attachment and operable with the auxiliary energy storage device disposed within the attachment. In one or more embodiments, this software command causes the auxiliary energy storage device carried by the attachment to deliver power to the electronic device. In one or more embodiments, this power is delivered to a connector or connector array of the electronic device.

At step 806, a power management control circuit carried by the electronic device powers the one or more processors, and corresponding circuit components, with the power delivered from the auxiliary energy storage device. At step 807, the power management control circuit precludes charging of a primary energy storage device carried by the electronic device with the power delivered from the auxiliary energy storage device. At step 808, the method 800 terminates, by the one or more processors, delivery of the power to the electronic device from the auxiliary energy storage device. In one or more embodiments, step 808 occurs when the function corresponding to the predefined functionality of the attachment ceases operating on the electronic device.

Returning to decision 804, where the function corresponding to the predefined functionality of the attachment is not operational on the electronic device, in one or more embodiments the method 800 prevents delivery of the power from the auxiliary energy storage device to the electronic device at step 809. From this point, the method 800 can return to decision 804. However, in one or more embodiments, optional steps 810-811 can be performed.

Embodiments of the disclosure contemplate that while reservation of energy stored in the auxiliary energy storage device of the attachment for use with attachment functionality is desirable in most cases, many users will be willing to sacrifice that reservation of energy to keep the electronic device active. Accordingly, steps 810-811 allow for the override of this reservation when the energy stored in the primary energy device carried by the electronic device falls below a predefined threshold.

At step 810, the method 800 detects an energy storage level of the primary energy storage device falling below a predefined energy storage threshold. Illustrating by example, when the primary energy storage device comprises an electrochemical cell, such as a lithium-ion or lithium-polymer cell, there will be a predefined threshold, such as 3.8 volts in a single cell application, where the primary energy storage device has insufficient energy to power the electronic device. Accordingly, in one or more embodiments step 810 comprises determining that a voltage of the primary energy storage device has fallen below a predefined voltage threshold.

Where this occurs, at step 811 the method 800 sends, by the one or more processors, a software command to a control circuit carried by the attachment and operable with the auxiliary energy storage device disposed within the attachment. In one or more embodiments, this software command causes the auxiliary energy storage device carried by the attachment to deliver power to the electronic device. In one or more embodiments, this power is delivered to a connector or connector array of the electronic device. At step 812, the method 800 allows charging of the primary energy storage device with power from the auxiliary energy storage device.

Figure 9:
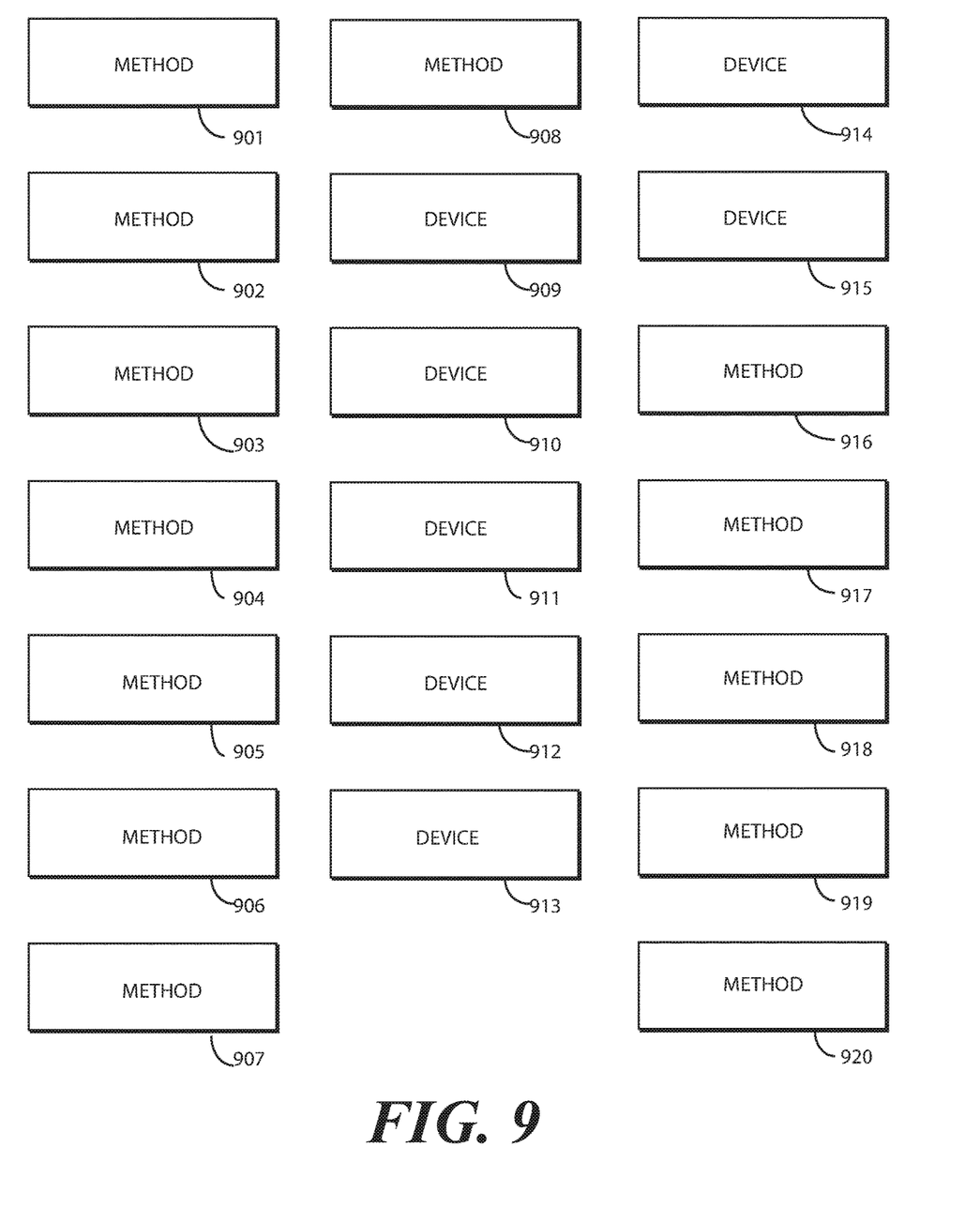
FIG. 9 illustrates various embodiments of the disclosure.

Turning now to FIG. 9, illustrated therein are various embodiments of the disclosure. At 901, a method comprises detecting, with one or more processors of an electronic device operating with an attachment having a predefined functionality, whether a function of the predefined functionality is operational on the electronic device. At 908, the predefined function of 901 is the one of a camera function, a gaming function, a music output function, or a video presentation function At 901, and when the function is operational on the electronic device, the one or more processors cause an auxiliary energy storage device carried by the attachment to deliver power to the electronic device. At 901, and when the function is operational on the electronic device, the one or more processors cause a power management control circuit carried by the electronic device to power the one or more processors with the power delivered from the auxiliary energy storage device. At 901, and when the function is operational on the electronic device, the one or more processors cause the power management control circuit to preclude charging of a primary energy storage device carried by the electronic device with the power delivered from the auxiliary energy storage device.

At 902, the method of 901 further comprises terminating, by the one or more processors, delivery of the power to the electronic device from the auxiliary energy storage device. At 903, the terminating of 902 occurs when the function ceases operating on the electronic device.

At 904, the method of 901 further comprises, when the function is not operational on the electronic device, preventing delivery of the power from the auxiliary energy storage device to the electronic device. At 905, the causing of the auxiliary energy storage device carried by the attachment to deliver power to the electronic device comprises sending, by the one or more processors, a software command to a control circuit carried by the attachment and operable with the auxiliary energy storage device.

At 906, the method of 905 further comprises converting, with the power management control circuit, a first voltage from the auxiliary energy storage device to a second voltage prior to powering of the one or more processors. At 907, the method of 905 further comprises, when the function is not operational, also causing, by the one or more processors detection of an energy storage level of the primary energy storage device, the following: an energy storage level of the primary energy storage device falling below a predefined energy storage threshold; the auxiliary energy storage device carried by the attachment to deliver the power to the electronic device; and allowance of charging of the primary energy storage device with the power from the auxiliary energy storage device.

At 909, an electronic device comprises one or more processors, a power management control circuit, a primary energy storage device, and a connector, receiving signals corresponding to a predefined function from an attachment having an auxiliary energy storage device. At 909, the one or more processors determine whether the predefined function is operational at the electronic device. At 909, and where the predefined function is operational at the electronic device, the power management control circuit of the electronic device powers the one or more processors with the power delivered from the auxiliary energy storage device to the connector. At 909, and where the predefined function is operational at the electronic device, the power management control circuit prevents charging of the primary energy storage device with the power delivered to the connector from the auxiliary energy storage device.

At 910, where when the predefined function of 909 becomes operational at the electronic device, the one or more processors deliver command signals to the connector causing delivery of the power to the connector from the auxiliary energy storage device. At 911, and when the predefined function is not operational, the one or more processors also detect an energy storage level of the primary energy storage device falling below a predefined energy storage threshold. At 911, and when the predefined function is not operational, the one or more processors allow charging of the primary energy storage device with the power from the auxiliary energy storage device.

At 912, the one or more processors of 909 detect the predefined function terminating at the electronic device. At 912, the one or more processors of 909 cease the powering of the one or more processors with the power delivered from the auxiliary energy storage device to the connector. At 913, the one or more processors of 912 deliver other command signals to the connector causing cessation of delivery of the power to the connector from the auxiliary energy storage device. In one or more embodiments, these command signals are delivered upon detecting the predefined function terminating at the electronic device.

At 914, the attachment is coupled to the connector of 909. At 915, the connector of 909 comprises a USB-type connector.

At 916, a method comprises detecting, with one or more processors of an electronic device operating with an attachment, whether a predefined function performed in conjunction with the attachment is operational on the electronic device. At 916, and when the predefined function is operational on the electronic device, the one or more processors cause an auxiliary energy device carried by the attachment to deliver power to the electronic device. At 916, and when the predefined function is operational on the electronic device, the one or more processors cause a power management control circuit carried by the electronic device to power the one or more processors with the power delivered from the auxiliary energy device. At 916, and when the predefined function is not operational on the electronic device, the one or more processors prevent delivery of the power from the auxiliary energy device to the electronic device.

At 917, the method of 916 further comprises precluding charging of a primary energy storage device carried by the electronic device with the power delivered from the auxiliary energy device when the predefined function is operational on the electronic device. At 918, the method of 916 further comprises delivering, by the one or more processors, command signals to the attachment to cause delivery of the power from the auxiliary energy device to the electronic device.

At 919, the method of 916 further comprises receiving one or more user preferences at a user interface of the electronic device, the one or more user preferences defining the predefined function. At 920, the attachment of 916 comprises one or more circuits defining the predefined function.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
   detecting, with one or more processors of an electronic device operating with an attachment having one or more circuit components defining a predefined functionality, whether the one or more circuit components are performing a function of the predefined functionality on the electronic device; and
   when the one or more circuit components are performing the function on the electronic device, causing, by the one or more processors:
   an auxiliary energy storage device carried by the attachment to deliver power to the electronic device by sending, by the one or more processors, a software command to a control circuit carried by the attachment and operable with the auxiliary energy storage device;
   a power management control circuit carried by the electronic device to power the one or more processors with the power delivered from the auxiliary energy storage device;
   the power management control circuit to preclude charging of a primary energy storage device carried by the electronic device with the power delivered from the auxiliary energy storage device; and converting, with the power management control circuit, a first voltage from the auxiliary energy storage device to a second voltage prior to powering of the one or more processors.

2. The method of claim 1, further comprising terminating, by the one or more processors, delivery of the power to the electronic device from the auxiliary energy storage device.

3. The method of claim 2, the terminating occurring when the one or more circuit components cease performing the function on the electronic device.

4. The method of claim 1, further comprising, when the one or more circuit components are not performing the function on the electronic device, preventing delivery of the power from the auxiliary energy storage device to the electronic device.

5. The method of claim 1, the software command causing the control circuit carried by the attachment to open or close a switch.

6. The method of claim 1, the attachment comprising one or more of a camera, a game pad, loudspeakers, or a projector.

7. The method of claim 1, further comprising, when the one or more circuit components are not performing the function, also causing, by the one or more processors:
  detection of an energy storage level of the primary energy storage device falling below a predefined energy storage threshold;
  the auxiliary energy storage device carried by the attachment to deliver the power to the electronic device; and
  allowance of charging of the primary energy storage device with the power from the auxiliary energy storage device.

8. The method of claim 1, wherein the function comprises one of a camera function, a gaming function, a music output function, or a video presentation function.

9. An electronic device, comprising:
  one or more processors;
  a power management control circuit;
  a primary energy storage device; and
  a connector, receiving signals corresponding to a predefined function from an attachment having an auxiliary energy storage device;
  the one or more processors determining whether the attachment is operating the predefined function at the electronic device, and when the attachment is operating the predefined function at the electronic device:
    the one or more processors deliver command signals to the connector causing delivery of power to the connector from the auxiliary energy storage device;
    the power management control circuit powers the one or more processors with the power delivered from the auxiliary energy storage device to the connector; and
    the power management control circuit prevents charging of the primary energy storage device with the power delivered to the connector from the auxiliary energy storage device; and
  when the attachment is not operating the predefined function, also causing, by the one or more processors:
    detection of an energy storage level of the primary energy storage device falling below a predefined energy storage threshold; and
    allowance of charging of the primary energy storage device with the power from the auxiliary energy storage device when the energy storage level of the primary energy storage device is below the predetermined energy storage threshold.

10. The electronic device of claim 9, the one or more processors:
  detecting the attachment terminating operation of the predefined function at the electronic device; and
  ceasing the powering of the one or more processors with the power delivered from the auxiliary energy storage device to the connector.

11. The electronic device of claim 10, the one or more processors delivering other command signals to the connector causing cessation of delivery of the power to the connector from the auxiliary energy storage device upon detecting the predefined function terminating at the electronic device.

12. The electronic device of claim 9, further comprising the attachment, coupled to the connector.

13. The electronic device of claim 12, the connector comprising a Universal Serial Bus (USB) type connector.

14. An electronic device, comprising:
  one or more processors;
  a power management control circuit;
  a primary energy storage device; and
  a connector, receiving signals corresponding to a predefined function from an attachment having an auxiliary energy storage device;
  the one or more processors determining whether the attachment is operating the predefined function at the electronic device, and when the attachment is operating the predefined function at the electronic device:
    the power management control circuit powers the one or more processors with power delivered from the auxiliary energy storage device to the connector; and
    the power management control circuit prevents charging of the primary energy storage device with the power delivered to the connector from the auxiliary energy storage device;
  the one or more processors also:
    detecting the attachment terminating operation of the predefined function at the electronic device; and
    ceasing powering of the one or more processors with the power delivered from the auxiliary energy storage device to the connector by delivering other command signals to the connector causing cessation of delivery of the power to the connector from the auxiliary energy storage device upon detecting the predefined function terminating at the electronic device.

15. The electronic device of claim 14, the predefined function comprising one or more of an image capture function, a gaming function, a music output function, or a video presentation function.

16. The electronic device of claim 14, the connector comprising a Universal Serial Bus (USB) type connector.

17. The electronic device of claim 14, further comprising a display, the one or more processors presenting an energy capacity indicator on the display, wherein the energy capacity indicator remains unaffected while the power management control circuit powers the one or more processors with the power delivered from the auxiliary energy storage device to the connector.

18. The electronic device of claim 17, the energy capacity indicator comprising a graphical representation of energy stored in the primary energy storage device.

19. The electronic device of claim 14, further comprising an identification module detecting an attachment type of the attachment.

20. The electronic device of claim 14, further comprising the power management control circuit regulating energy delivery to the primary energy storage device.

\* \* \* \* \*